United States Patent
Koike et al.

(10) Patent No.: US 12,071,499 B2
(45) Date of Patent: Aug. 27, 2024

(54) MODIFIED POLYOLEFIN RESIN AND DISPERSION COMPOSITION THEREOF

(71) Applicant: NIPPON PAPER INDUSTRIES CO., LTD., Kita-ku (JP)

(72) Inventors: Ryo Koike, Tokyo (JP); Fumiyasu Sakakibara, Tokyo (JP); Shunji Sekiguchi, Tokyo (JP); Ryuji Doi, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 0 days.

(21) Appl. No.: 17/638,050

(22) PCT Filed: Aug. 24, 2020

(86) PCT No.: PCT/JP2020/031862
§ 371 (c)(1),
(2) Date: Feb. 24, 2022

(87) PCT Pub. No.: WO2021/039729
PCT Pub. Date: Mar. 4, 2021

(65) Prior Publication Data
US 2022/0282019 A1    Sep. 8, 2022

(30) Foreign Application Priority Data
Aug. 29, 2019   (JP) .................................. 2019-157406

(51) Int. Cl.
*C08F 255/04*   (2006.01)
*C08F 255/10*   (2006.01)

(52) U.S. Cl.
CPC .......... *C08F 255/04* (2013.01); *C08F 255/10* (2013.01)

(58) Field of Classification Search
CPC .... C09J 151/06; C09D 151/06; C08F 255/02; C08F 255/04; C08F 255/08; C08F 255/10
See application file for complete search history.

(56) References Cited

U.S. PATENT DOCUMENTS

| | | |
|---|---|---|
| 2007/0191547 A1 | 8/2007 | Sekiguchi |
| 2009/0092847 A1* | 4/2009 | Onoe ............... C09D 151/06 524/612 |
| 2009/0226728 A1* | 9/2009 | Onoe ............... C09D 5/02 524/505 |
| 2016/0280828 A1 | 9/2016 | Kawabe et al. |

FOREIGN PATENT DOCUMENTS

| | | |
|---|---|---|
| CN | 1930198 A | 3/2007 |
| CN | 101384645 A | 3/2009 |
| JP | 2007-270122 A | 10/2007 |
| JP | 2008-137273 A | 6/2008 |
| JP | 2015-105294 A | 6/2015 |
| JP | 2015-174884 A | 10/2015 |
| WO | WO 2015/046378 A1 | 4/2015 |
| WO | WO 2015/079919 A1 | 6/2015 |

OTHER PUBLICATIONS

International Search report issued Nov. 2, 2020 in PCT/JP2020/031862, filed on Aug. 24, 2020, 3 pages.
"Basic Properties of TAFMER™ XM", https://jp.mitsuichemicals.com/sites/default/files/media/document/brand003.pdf. Retrieval date: Oct. 20, 2020, 2 pages (with English Translation).
Chinese Office Action dated Aug. 24, 2023, in Chinese Patent Application No. 2020800608449 (with English Translation).
Japanese Office Action issued Feb. 13, 2024 in Japanese Patent Application No. 2021-542897 (with unedited computer generated English translation), 6 pages.

* cited by examiner

*Primary Examiner* — Christopher M Rodd
(74) *Attorney, Agent, or Firm* — Oblon, McClelland, Maier & Neustadt, L.L.P.

(57) ABSTRACT

The present invention has an object to provide a modified polyolefin resin capable of forming a coating film that is excellent in water-resistant adhesiveness under a high temperature condition. The present invention provides a modified polyolefin resin including a graft-modified product in which a component (A) that is a polyolefin resin is graft-modified with a component (B) that is an $\alpha,\beta$-unsaturated carboxylic acid or a derivative thereof, and having a tensile modulus of 250 MPa or higher, and a weight-average molecular weight of 70,000 or more and less than 200,000.

10 Claims, No Drawings

MODIFIED POLYOLEFIN RESIN AND DISPERSION COMPOSITION THEREOF

FIELD

The present invention relates to a modified polyolefin resin and a dispersion composition thereof. More specifically, the present invention relates to a modified polyolefin resin and a dispersion composition thereof having an excellent water-resistant adhesiveness under a high temperature condition.

BACKGROUND

In general, a polyolefin such as polypropylene and polyethylene is inexpensive and has many superior properties in moldability, chemical resistance, water resistance, electric characteristics, and the like. Accordingly, in recent years, these polyolefins have been widely used as the material for a sheet, a film, a molded article, and the like. However, unlike a polar substrate such as a polyurethane type resin, a polyamide type resin, an acrylic type resin, and a polyester type resin, polyolefin substrates are nonpolar and crystalline, so that coating or adhesion to polyolefin substrates is difficult.

To solve the adhesiveness problem described above, a proposal has been made that a substrate surface is undercoated with a primer that is capable of adhering to a polyolefin type resin and a urethane resin type coating material or the like is applied onto this undercoat layer. As a primer like this, a modified polyolefin type resin with an added polar group (a carboxy group, an acid anhydride group, or the like) is used. Here, by adding the polar group, not only an affinity to a polyolefin type resin substrate but also an affinity to the urethane resin type coating material or the like is enhanced, thereby enhancing the adhesiveness (Patent Literature 1).

CITATION LIST

Patent Literature

Patent Literature 1: Japanese Patent Application Laid-open No. 2015-105294

SUMMARY

Technical Problem

A modified polyolefin type resin is widely used as a primer for a resin substrate in an automobile bumper or the like. In recent years, with an aim to reduce the body weight of a car, automobile manufactures have employed the policy of substituting the body steel plate substrate with a resin substrate. With this trend, a primer for a resin substrate for a body having the film forming properties equivalent to those of the steel plate coating has been needed.

In a body coating, especially in the adhesive for the direct glazing technique in which a window glass and a body are directly bonded or an adhesive between a side window glass and a window frame in a car, not only a durable adhesion strength but also reduced deterioration even under exposure to high temperature is required. Accordingly, a test is conducted under a higher temperature condition as compared with the test for water-resistant adhesiveness in the primer for a bumper.

More specifically, in the test of the water-resistant adhesiveness of the adhesive for the direct glazing technique under a high temperature condition, firstly, a urethane type adhesive is applied onto the film coated on a resin substrate to prepare a test plate. Next, the test plate thus prepared is soaked in a constant temperature water bath whose temperature is set at 60° C. for 10 days; then, assessment is conducted by a peeling test of the adhesive layer. In the hot-water resistance test of the coating film of a bumper, after a test piece coated on a resin substrate is soaked in a constant temperature water bath at 40° C. for 10 days, assessment is conducted by a peeling test of the coating film.

Therefore, in the conventional modified polyolefin resin used in the primer for a bumper, the adhesive used in the direct glazing technique whose test temperature is high cannot provide the coating film with a sufficient strength and adhesiveness, which may cause a cohesion fracture in the coating film.

Accordingly, it is difficult for a primer using the conventional polyolefin type resin to express a sufficient physical property in the coating film in the point of water-resistant adhesiveness.

An object of the present invention is to provide a modified polyolefin resin capable of producing a coating film having a superior water-resistant adhesiveness under a high temperature condition.

Solution to Problem

The inventors of the present invention carried out an extensive investigation to achieve the object mentioned above; and as a result, it has been found that a graft-modified product, obtained by graft-modifying a polyolefin resin with an $\alpha,\beta$-unsaturated carboxylic acid or with a derivative thereof so as to make the tensile modulus and the weight-average molecular weight thereof fall within the prescribed ranges, as well as a dispersion composition including this substance are able to achieve the object mentioned above. The present invention has been completed based on these findings.

The inventors of the present invention provide the following (1) to (10).

(1) A modified polyolefin resin comprising a graft-modified product in which a component (A) that is a polyolefin resin is graft-modified with a component (B) that is an $\alpha,\beta$-unsaturated carboxylic acid or a derivative thereof, and having a melting point measured with a differential scanning calorimeter is 85° C. or higher and lower than 110° C. and a tensile modulus of 250 MPa or higher, and a weight-average molecular weight of 70,000 or more and less than 200,000.

(2) The modified polyolefin resin according to (1), wherein a melting point measured with a differential scanning calorimeter is 85° C. or higher and lower than 110° C.

(3) The modified polyolefin resin according to (1) or (2), wherein the component (A) comprises at least one copolymer selected from the group consisting of an ethylene-propylene copolymer, a propylene-1-butene copolymer, and an ethylene-propylene-1-butene copolymer.

(4) The modified polyolefin resin according to any one of (1) to (3), wherein a graft weight of the component (B) in the graft-modified product is in a range of 0.1 to 10% by weight.

(5) A dispersion composition comprising the modified polyolefin resin according to any one of (1) to (4).

(6) The dispersion composition according to (5), wherein a melting point measured with a differential scanning calorimeter is 90° C. or higher and lower than 110° C.

(7) The dispersion composition according to (5) or (6), wherein the dispersion composition is a primer.

(8) The dispersion composition according to (5) or (6), wherein the dispersion composition is a coating material.

(9) The dispersion composition according to (5) or (6), wherein the dispersion composition is an ink.

(10) The dispersion composition according to (5) or (6), wherein the dispersion composition is an adhesive.

Advantageous Effects of Invention

According to the modified polyolefin resin of the present invention, a coating film having a superior water-resistant adhesiveness under a high temperature condition can be produced.

DESCRIPTION OF EMBODIMENTS

Hereinafter, the present invention will be described in detail on the basis of preferred embodiments.

In this specification, the expression "AA to BB" means AA or more to BB or less.

1. Modified Polyolefin Resin

The modified polyolefin resin of the present invention includes a graft-modified product obtained by graft-modifying a component (A) that is a polyolefin resin (hereinafter, this is also described as "component (A)"), with a component (B) that is an α,β-unsaturated carboxylic acid or a derivative thereof (hereinafter, this is also described as "component (B)"). The modified polyolefin resin has a tensile modulus of 250 MPa or more and a weight-average molecular weight (hereinafter, this is also called "Mw") of 70,000 or more and less than 200,000. In addition, the melting point (hereinafter, this is also called "Tm") of the modified polyolefin resin measured by a differential scanning calorimeter (hereinafter, this is also called "DSC") is preferably 85° C. or higher and lower than 110° C.

The reason why the modified polyolefin resin of the present invention can produce a coating film having a superior water-resistant adhesiveness under a high temperature condition is inferred to be as follows.

The modified polyolefin resin of the present invention has a Mw within the prescribed range and a tensile modulus at least as high as the prescribed value. When the Mw is within the prescribed range, the coating film can be provided with a cohesive force and an adhesiveness, and in addition, a solubility of the resin in a solvent can be ensured. Therefore, an adhesiveness to a substrate can be ensured. When the tensile modulus is at least the prescribed value, the coating film can be provided with a sufficient strength. Therefore, even under a high temperature condition, the film strength of the coating film can be maintained and the adhesiveness with a substrate can be ensured. Because of these aspects, it is inferred that the modified polyolefin resin of the present invention can express the superior effect that the coating film having the excellent water-resistant adhesiveness under a high temperature condition can be produced.

In addition, when Tm is within the prescribed range, not only the water-resistance under a high temperature condition can be further enhanced, but also a superior film forming property at the time of coating baking can be ensured.

In the modified polyolefin resin of the present invention, the Mw is 70,000 or more and less than 200,000, while preferably 80,000 or more and less than 150,000. When the Mw is 70,000 or more, the coating film after drying can express a cohesion force, so that the film strength and the adhesiveness can be provided. On the other hand, when the Mw is less than 200,000, sufficient solubility in a solvent can be ensured. In addition, at the time of preparation of an aqueous dispersion, a good stability can be ensured.

In this specification, the Mw is a value measured and calculated with gel permeation chromatography (reference material: polystyrene).

The Tm of the modified polyolefin resin of the present invention is preferably 85° C. or higher and lower than 110° C., while more preferably 90° C. or higher and lower than 105° C. When the Tm is 85° C. or higher, the sufficient water resistance under a high temperature condition can be enhanced further. When the melting point is lower than 110° C., the superior film forming property at the time of coating baking can be ensured.

In this specification, the Tm obtained by DSC is the value measured with the following condition. In accordance with the method described in JIS K7121-1987, a DSC measurement instrument (manufactured by TA Instruments Inc.) is used, and about 5 mg of the sample is kept under the molten state at 150° C. for 10 minutes. Next, the temperature is lowered at a rate of 10° C./minute and kept stable at −50° C. Next, the temperature is raised to 150° C. at a rate of 10° C./minute. The peak temperature at the time of melting is assessed as Tm.

In the modified polyolefin resin of the present invention, the tensile modulus is 250 MPa or more, while more preferably 300 MPa or more. When the tensile modulus is 250 MPa or more, the coating film can be provided with a sufficient strength. Here, the upper limit is not particularly restricted; the value is ordinarily 8000 MPa or less, preferably 5000 MPa or less, 3000 MPa or less, or 1000 MPa or less, more preferably 800 MPa or less, still more preferably 600 MPa or less, while further still more preferably 500 MPa or less.

In this specification, the tensile modulus of the modified polyolefin resin is the value measured with the following condition. Firstly, an aqueous dispersion composition of the modified polyolefin resin is dried to obtain a dried product. The dried product thus obtained is dissolved by heating into an organic solvent; then, the solution thus obtained is applied onto releasing paper so as to form a film with a thickness of about 20 μm. After this is dried for 5 minutes with a blowing dryer whose temperature is set to 100° C., the result is kept for 24 hours under constant temperature and constant humidity conditions at 23° C. and a relative humidity of 50%. Next, this is cut to a width of 15 mm and a length of 150 mm; then, the releasing paper is removed to obtain a test film. For the test film thus obtained, the tensile modulus is measured with a tensile measurement instrument under the conditions of a pulling speed of 10 mm/minute and a distance between the chucks of 100 mm.

As can be seen from the measurement conditions described above, the tensile modulus of the modified polyolefin resin is the value measured with the condition of a pulling speed of 10 mm/minute and a distance between the chucks of 100 mm using the test film formed of the modified polyolefin resin having a width of 15 mm and a length of 150 mm.

1-1. Component (A): Polyolefin Resin

The component (A) is not particularly restricted. This may be a homopolymer of one olefin, or a copolymer of two or more olefins. In the case of a copolymer, this may be any of a random copolymer and a block copolymer. Preferably, an α-olefin is used as the olefin. Ethylene, propylene, 1-butene, 1-pentene, 1-hexene, 1-heptene, and 1-octene may be given as examples of the α-olefin.

From a viewpoint of expressing sufficient adhesiveness to a non-polar resin substrate such as a polypropylene substrate, the component (A) is more preferably polypropylene (propylene homopolymer), an ethylene-propylene copolymer, a propylene-1-butene copolymer, or an ethylene-propylene-1-butene copolymer.

In this specification, the term polypropylene expresses a polymer whose basic unit is a structural unit derived from propylene. The term ethylene-propylene copolymer expresses a copolymer whose basic units are a structural unit derived from ethylene and a structural unit derived from propylene. The term propylene-1-butene copolymer expresses a copolymer whose basic units are a structural unit derived from propylene and a structural unit derived from 1-butene. These polymers may contain a small quantity of a structural unit derived from an olefin other than the basic units mentioned above. The quantity of this unit is not particularly restricted as long as the inherent performance of the resin itself is not significantly impaired. The structural unit derived from another olefin may be contaminated, for example, at the processes up through the production of the modified polyolefin resin.

It is preferable that the component (A) contains 60% or more by mole of the structural unit derived from propylene relative to 100% by mole of the structural units. When the quantity of the structural unit derived from propylene is within the range described above, the adhesiveness to the substrate or a molded article such as a non-polar resin (for example, propylene resin) can be ensured.

Because of the characteristics described below, the component (A) is preferably the polyolefin resin that is obtained using a metallocene catalyst as the polymerization catalyst. The component (A) that is obtained using the metallocene catalyst has a narrow molecular weight distribution. When the component (A) is a copolymer, random copolymerization is superior, the composition distribution is narrow, and there is a range of comonomers that can be copolymerized.

As for the metallocene catalyst, known metallocene catalysts may be used. It is preferable that the metallocene catalyst is obtained by mixing the components (1) and (2) described below, along with the component (3) if needed described below:

component (1): a metallocene complex of a transition metal compound of the group 4 to 6 in the periodic table, having at least one conjugated five-membered ring ligand,
component (2): an ion-exchangeable layered silicate, and
component (3): an organic aluminum compound.

In the case when the ethylene-propylene copolymer and the propylene-butene copolymer are random copolymers, the ratio of the structural unit derived from ethylene or the structural unit derived from butene is preferably in the range of 5 to 50% by mole and of the structural unit derived from propylene is preferably in the range of 50 to 95% by mole relative to 100% by mole of the structural units.

From a viewpoint of providing sufficient strength to the coating film, the tensile modulus of the component (A) is preferably 150 MPa or more, while more preferably 250 MPa or more. The upper limit is ordinarily 8000 MPa or less, preferably 5000 MPa or less, 3000 MPa or less, or 1000 MPa or less, more preferably 800 MPa or less, while still more preferably 600 MPa or less.

The measurement of the tensile modulus of the component (A) may be done in the same way as the measurement of the tensile modulus of the modified polyolefin resin.

The melting point of the component (A) is preferably 80° C. or higher and lower than 110° C., while more preferably 85° C. or higher and lower than 105° C. By doing so, the modified polyolefin resin having the melting point within the before-mentioned range can be readily obtained. The weight-average molecular weight of the component (A) is 70,000 or more and lower than 500,000, while preferably 80,000 or more and less than 400,000.

Only one type of the component (A) or a combination of two or more types may be used. In the case when two or more kinds are used in combination, the ratio of them is not particularly restricted.

1-2. Component (B): α,β-Unsaturated Carboxylic Acid or Derivative Thereof

The component (B) is an α,β-unsaturated carboxylic acid or a derivative thereof. Illustrative examples of the α,β-unsaturated carboxylic acid and the derivative thereof include maleic acid, maleic anhydride, fumaric acid, citraconic acid, citraconic anhydride, mesaconic acid, itaconic acid, itaconic anhydride, aconitic acid, aconitic anhydride, himic anhydride, (meth)acrylic acid, and (meth)acrylate ester. Among these, maleic anhydride is preferable.

The component (B) may be at least one compound selected from the group consisting of α,β-unsaturated carboxylic acids and derivatives thereof, a combination of one or more α,β-unsaturated carboxylic acids and one or more derivatives of the α,β-unsaturated carboxylic acid, a combination of two or more α,β-unsaturated carboxylic acids, or a combination of two or more derivatives of α,β-unsaturated carboxylic acids.

The graft weight of the component (B) in the graft-modified product is preferably in the range of 0.1 to 10% by weight and more preferably in the range of 0.5 to 5% by weight, relative to 100% by weight of the graft-modified product. When the graft weight is 0.1% or more by weight, the adhesiveness of the obtained modified polyolefin resin to the overcoating coating material can be ensured. In addition, good stability can be ensured when preparing the aqueous dispersion solution. When the graft weight is 10% or less by weight, the production of graft unreacted substances can be avoided, so that sufficient adhesiveness to the resin substrate can be ensured.

The graft weight of the component (B) is the value found by alkaline titration.

1-3. Graft-Modified Product

The graft-modified product can be prepared by graft-modifying (graft-polymerizing) the component (A) with the component (B). The graft-modification can be done by a known method. Here, a component (C), i.e., radical-generating agent, may be used (hereinafter, this is also called "component (C)"). Illustrative examples of the graft-modification method include: a solution method in which a mixture of the component (A) and the component (B) is dissolved by heating in an organic solvent such as toluene, and the component (C) is added; and a method in which the component (A), the component (B), and the component (C) are added into a kneading machine such as a Banbury mixer, a kneader, or an extruder, and a melt-kneading reaction under heat obtains the graft-modified product. Here, the component (A), the component (B), and the component (C) may be added all at once or sequentially.

The component (C) may be arbitrarily selected from known radical generating agents. Among them, an organic peroxide type compound is preferable. Illustrative examples of the organic peroxide type compound include di-t-butyl peroxide, dicumyl peroxide, t-butylcumyl peroxide, benzoyl peroxide, dilauryl peroxide, cumene hydroperoxide, t-butyl hydroperoxide, 1,4-bis[(t-butylperoxy)isopropyl]benzene, 1,1-bis(t-butylperoxy)-3,5,5-trimethylcyclohexane, 1,1-bis (t-butylperoxy)-cyclohexane, cyclohexanone peroxide, t-butylperoxy benzoate, t-butylperoxy isobutyrate, t-butylperoxy-3,5,5-trimethyl hexanoate, t-butylperoxy-2-ethyl hexanoate, t-butylperoxy isopropyl carbonate, and cumylperoxy octoate. Among these, di-t-butyl peroxide, dicumyl peroxide, and dilauryl peroxide are preferable.

The component (C) may be a single radical generating agent, or a combination of a plurality of the radical generating agents.

The addition amount of the component (C) in the graft polymerization reaction is, relative to the addition amount (weight) of the component (B), preferably in the range of 1 to 100% by weight, while more preferably in the range of 10 to 50% by weight. When the addition amount is 1% or more by weight, a sufficient grafting efficiency can be ensured. When the addition amount is 100% or less by weight, a decrease in the weight-average molecular weight of the graft-modified product can be avoided.

The modified polyolefin resin may include at least one graft-modified product, so a combination of two or more graft-modified products (for example, two or more graft-modified products having different kinds or compositions of the component (A) and/or the component (B)) may also be included. The graft-modified product may further include a component other than a graft-modified product, such as a component other than a graft-modified product that is formed during graft-modification (for example, unreacted components (A) and (B), and a polymer of the components (B)).

The modified polyolefin resin of the present invention may be used as it is (for example, as a solid form such as pellets), although it is preferable to add the modified polyolefin resin into a dispersing medium (solvent) for use as a dispersion.

2. Dispersion Composition

The dispersion composition of the present invention includes the modified polyolefin resin. The dispersion composition of the present invention may include another component as needed. The dispersion composition is suitably used as a film-forming composition, such as a primer, a coating material, an ink, and an adhesive.

Ordinarily, the dispersion composition includes the modified polyolefin resin and a dispersing medium, and optionally another resin component. Illustrative examples of the other resin component include a urethane resin, an epoxy resin, an acrylic resin, a phenol resin, an alkyd resin, a polyamide resin, a polyimide resin, a silicone resin, and cellulose nitrate, as well as a mixture of two or more of these resins. These resins may be added as an aqueous substance (for example, an aqueous acrylic resin and an aqueous polyurethane resin) into the modified polyolefin resin or into the dispersion thereof. The blending ratio of the modified polyolefin resin to the other resin (when two or more other resins are used, the total amount of them), i.e., modified polyolefin resin:other resin, is ordinarily in the range of 1 to 99:99 to 1, preferably 10 to 90:90 to 10, more preferably 20 to 80:80 to 20, while still more preferably 30 to 70:70 to 30, in terms of the solid component.

With an aims of quality stabilization and the like, the dispersion composition may be blended with an additive component, such as an aqueous acrylic resin, an aqueous urethane resin, a lower alcohol, a lower ketone, a lower ester, a preservative, a leveling agent, an antioxidant, a light stabilizer, a UV absorber, a dye, a pigment, a metal salt, and an acid.

The dispersing medium may be either a non-aqueous type or an aqueous type (hereinafter, a dispersion composition including an aqueous type dispersing medium is also called an "aqueous dispersion composition"). Illustrative examples of the non-aqueous type dispersing medium include organic solvents such as xylene, toluene, and benzene. Ordinarily, the aqueous type dispersing medium is water, but this may be used together with an alcohol type solvent, a glycol type solvent, a ketone type solvent, or an ester type solvent.

When the dispersion composition is the aqueous dispersion composition, this may include a crosslinking agent as the other component. A "crosslinking agent" is a compound that forms a crosslinking structure by reacting with a hydroxy group, a carboxy group, an amino group, or the like that is present in a component such as the modified polyolefin resin, a surfactant, and a neutralizing agent. Illustrative examples of the crosslinking agent include a blocked isocyanate compound, an aliphatic or an aromatic epoxy compound, an amine type compound, and an amino resin. The addition method of the crosslinking agent is not particularly restricted. For example, the crosslinking agent may be added during the process of converting to an aqueous system or after the aqueous conversion.

As for the surfactant, either a nonionic surfactant or an anionic surfactant may be used. The nonionic surfactant is preferably used because the water resistance of the aqueous dispersion composition to be obtained is better and can be favorably used.

The nonionic surfactants that can be mentioned are: a polyoxyethylene alkyl ether, a polyoxyethylene alkylene alkyl ether, a polyoxyethylene derivative, a polyoxyethylene aliphatic acid ester, a polyoxyethylene polyalcohol aliphatic acid ester, a polyoxyethylene propylene polyol, a polyoxyethylene sorbitan aliphatic acid ester, a polyoxyethylene cured castor oil, a polyoxyalkylene polycyclic phenyl ether, a polyoxyethylene alkylamine, an alkylalkanol amide, and a polyalkylene glycol (meth)acrylate. Among these, a polyoxyethylene alkyl ether, a polyoxyethylene aliphatic acid ester, a polyoxyethylene sorbitan aliphatic acid ester, and a polyoxyethylene alkylamine are preferable.

The anionic surfactants that can be mentioned are: an alkyl sulfate ester salt, a polyoxyethylene alkyl ether sulfate salt, an alkylbenzenesulfonate salt, an α-olefinsulfonate salt, a methyltaurate salt, a sulfosuccinate salt, an ether sulfonate salt, an ether carboxylate salt, an aliphatic acid salt, a naphthalenesulfonic acid formalin condensate, an alkylamine salt, a quaternary ammonium salt, an alkylbetaine, and an alkylamine oxide. Among these, a polyoxyethylene alkyl ether sulfate salt and a sulfosuccinate salt are preferable.

In the case where the surfactant is used at the time of preparing the aqueous dispersion composition, it is preferable that the amount of the surfactant is as small as possible, or the surfactant is not added. The reason for this is as follows. When the surfactant is added, the performance of the film may deteriorate at the time of forming the film; or a plasticizing effect or a bleeding phenomenon may occur at the time of forming a dry film, which may cause blocking.

The aqueous dispersion composition may further include a neutralizing agent, with which dispersibility of the resin into the aqueous dispersing medium can be enhanced. Illustrative examples of the neutralizing agent include ammonia, methylamine, ethylamine, dimethylamine, diethylamine, triethylamine, propylamine, isopropylamine, dipropylamine, isobutylamine, hexylamine, octylamine, ethanolamine, propanolamine, diethanolamine, N-methyldiethanolamine, N,N-dimethylethanolamine, N,N-diethylethanolamine, N,N-dibutylethanolamine, 2-dimethylamino-2-methyl-1-propanol, 2-amino-2-methyl-1-propanol, 2-aminoethanol, 2-dimethylaminoethanol, 2-diethylaminoethanol, 3-ethoxypropylamine, 3-diethylaminopropylamine, sec-butylamine, n-butylamine, 2-methoxyethylamine, 3-methoxypropylamine, 2,2-dimethoxyethylamine, morpholine, N-methylmorpholine, N-ethylmorpholine, a piperazine, pyrrole, pyridine, as well as metal hydroxides such as sodium hydroxide, potassium hydroxide, and magnesium hydroxide.

Among these, from a viewpoint of easy emulsification and dispersion, preferable are morpholine, N,N-dimethylethanolamine, N,N-diethylethanolamine, and 2-amino-2-methyl-1-propanol.

The boiling point of the neutralizing agent at normal pressure is preferably 200° C. or lower. When the boiling point is higher than 200° C., in the case, for example, when the aqueous dispersion composition is made into a coating film, it may be difficult to remove the neutralizing agent by drying at the water-removal process. Therefore, a situation may occur in which the water resistance and the humidity resistance of the coating film deteriorate especially during low-temperature drying, or the adhesiveness to the substrate of a non-polar resin molded article or the like deteriorates.

The neutralizing agent may be used singly or as a combination of two or more kinds of the agent. In the case when the combination of two or more agents is used, the blending ratio of them is not particularly restricted.

In the aqueous dispersion composition, the amount of the neutralizing agent is not particularly specified, although the amount is preferably 3.0 or less times equivalent to the carboxyl group in the graft-modified product. With this, excessive rising of the pH in the aqueous dispersion composition can be suppressed. The lower limit is preferably 0.5 or more times equivalent to the carboxyl group. With this, excessive lowering of the pH in the aqueous dispersion composition can be suppressed.

In the case that the dispersion composition is the aqueous dispersion composition, the pH of the aqueous dispersion composition is preferably 5 or higher, while more preferably in the range of 6 to 11. When the pH is lower than 5, the neutralization is insufficient, so that the modified polyolefin resin may not disperse into the water. Even if the dispersion can be done, deposition or separation can readily occur with the passage of time thereby leading to inferior storage stability. On the other hand, when the pH is higher than 11, a problem may occur in the compatibility with other components or in work safety. Here, the pH may be controlled by the amount of the neutralizing agent that is added at the time of preparing the aqueous dispersion composition.

In the case that the dispersion composition is the aqueous dispersion composition, the average particle diameter of the resin that is emulsified or dispersed in water is preferably 300 nm or less, while more preferably 200 nm or less. When the average particle diameter is more than 300 nm, the storage stability of the aqueous dispersion composition or the compatibility with other resin may deteriorate. In addition, when a film is formed, the physical properties of the film, such as adhesiveness to the substrate, solvent resistance, water resistance, and anti-blocking resistance may deteriorate. The average particle diameter can be controlled with conditions such as the composition of the modified polyolefin resin, the amount of the dispersing medium, the addition amount and kind of the emulsifying agent, and the agitation power at the time of dispersion.

In this specification, the average particle diameter is the value obtained by measuring the particle size distribution with a light scattering method.

When a large amount of the emulsifying agent is added, the particle diameter can be made extremely small. However, when a large amount of the emulsifying agent is added, physical properties of the film, such as adhesiveness to the substrate, water resistance, and the anti-gas hole property tend to decrease.

Tm of the dispersion composition is preferably 85° C. or higher and lower than 110° C., or 90° C. or higher and lower than 110° C., while more preferably 90° C. or higher and lower than 105° C. When Tm is 85° C. or higher, the adequate water resistance at a high temperature condition can be enhanced even further. On the other hand, when the melting point is lower than 110° C., the superior filming property at the time of coating baking can be ensured.

In this specification, Tm of the dispersion composition can be measured using the dried product, which is obtained by drying the dispersion composition at 40° C. for 24 hours, with the same method as the measurement of Tm of the modified polyolefin resin by using a DSC (manufactured by TA Instruments Inc.), as described above.

The dispersion composition of the present invention can function as an intermediate medium to the substrate, such as a molded article of a non-polar resin, to which application of a coating material or the like is difficult due to the inferior adhesiveness. For example, the dispersion composition is also useful as the adhesive to adhere the polyolefin type substrates such as polypropylene and polyethylene that are inferior in adhesiveness, and can be used regardless of whether or not the surface of the substrate such as the molded article of a non-polar resin is plasma-treated, corona-treated, or the like.

In addition, when the dispersion composition of the present invention is laminated onto the surface of the molded article of a non-polar resin such as a polyolefin type substrate by hot-melting followed by the application of a coating material or the like, the adhesion stability or the like of the coating material can be enhanced.

This composition is also suitable to a polar substrate such as a polyester including polyethylene terephthalate, a polyurethane, and a polyamide.

The dispersion composition of the present invention can be suitably used as a primer, a coating material, an ink, an adhesive, and the like.

The production method of the dispersion composition is not particularly restricted. For example, a method that includes at least a dispersing process at which the modified polyolefin resin is added to a dispersing medium for dispersion may be mentioned. In the case that the dispersion composition is the aqueous dispersion composition, before the dispersing process, a preceding process may be carried out at which the modified polyolefin resin is added to an organic solvent for dissolution (preferably under a heating condition) and then the organic solvent is distilled out. When the neutralizing agent is used, it is preferable to add the neutralizing agent at the stage when the modified polyolefin resin has dissolved in the organic solvent. In the case that the dispersion composition includes another resin component, it is preferable that this resin component is blended after the dispersing process. For example, after the dispersing process, a resin component blending process at which the solid portion is adjusted, as needed, by blending the resin component (for example, diluting by adding a dispersing medium) may be carried out.

EXAMPLES

Hereinafter, the present invention will be explained in more detail with Examples. The Examples described hereinafter are to explain the present invention properly, not to restrict the present invention. The measurement methods of the physical properties and so forth are those described above, unless otherwise specifically mentioned. In addition, "parts" means parts by weight unless otherwise specifically mentioned.

Measurement Methods of Physical Properties

Mw and the graft weight of maleic anhydride were measured using the modified polyolefin resin. Tm, the tensile modulus, and the average particle diameter were measured using the aqueous dispersion composition. Details of the measurement methods are described below.

Mw (Weight-Average Molecular Weight)

The resins prepared in the production examples were measured with GPC with the following conditions.
Apparatus: HLC-8320GPC (manufactured by Tosoh Corp.)
Columns: TSK-gel G-6000 H×L, G-5000 H×L, G-4000 H×L, G-3000 H×L, and G-2000 H×L (manufactured by Tosoh Corp.)
Eluent: THF
Flow rate: 1 mL/minute
Temperature: 40° C. in pump oven and column oven
Injection volume: 100 μL
Reference material: polystyrene EasiCal PS-1 (manufactured by Agilent Technologies, Inc.)

Graft Weight (% by Weight)

This was measured with the alkaline titration method.

Tm (Melting Point; ° C.)

In accordance with the method described in JIS K7121-1987, a DSC measurement instrument (manufactured by TA Instruments Inc.) was used and about 5 mg of the sample was kept under the molten state at 150° C. for 10 minutes. Next, the temperature was lowered at a rate of 10° C./minute and kept stable at −50° C. Next, the temperature was raised to 150° C. at a rate of 10° C./minute. The peak temperature at the time of melting was measured as Tm.

Tm of the aqueous dispersion composition was measured using the dried product that was obtained by drying the aqueous dispersion composition at 40° C. for 24 hours, with the same condition as described above using the DSC (manufactured by TA Instruments Inc.).

Tensile Modulus

The aqueous dispersion composition was dried at 40° C. for 24 hours to obtain a dried product, which was then dissolved in an organic solvent to obtain a solution. The solution thus obtained was applied onto releasing paper so as to form a film with a thickness of about 20 μm. After this was dried for 5 minutes with a blowing dryer whose temperature was set to 100° C., the result was kept for 24 hours under constant temperature and constant humidity conditions at 23° C. and a relative humidity of 50% to obtain the coating film. This coating film was cut to a width of 15 mm and a length of 150 mm; then, the releasing paper was removed to obtain a test film. The tensile modulus of the test film thus obtained was measured with a tensile measurement instrument (Tensilon Universal Material Testing Machine; manufactured by A&D Co., Ltd.) under the conditions of a pulling speed of 10 mm/minute and a distance between the chucks of 100 mm.

Average Particle Diameter (nm)

The average particle diameter was measured using a particle size distribution measurement instrument (manufactured by Malvern Instruments Inc.)

Example 1

In a four-necked flask equipped with an agitator, a cooling tube, and a dropping funnel, a propylene-1-butene copolymer (I) (80% by mole of the propylene component and 20% by mole of 1-butene component; Mw of 100,000; Tm of 85° C.; and tensile modulus of 160 MPa) and a propylene-1-butene copolymer (II) (90% by mole of the propylene component and 10% by mole of the 1-butene component; Mw of 100,000; Tm of 100° C.; and tensile modulus of 360 MPa) were heated and dissolved in 400 g of toluene so as to make a total of 100 parts with a weight ratio of 50:50. While stirring and maintaining the system-internal temperature at 110° C., 4.5 parts of maleic anhydride and 3.0 parts of di-t-butylperoxide were each added dropwise into the system over 3 hours. After completion of the dropwise addition, the reaction was further continued for one hour; then, the reaction solution was cooled to room temperature. The reaction solution was poured into a large excess of acetone for purification to obtain the modified polyolefin resin (1) having Mw of 100,000 and Tm of 90° C. The graft weight of the maleic anhydride was 3.0% by weight.

Next, into the four-necked flask equipped with an agitator, a cooling tube, a thermometer, and a funnel were added 100 g of the modified polyolefin resin (1) thus obtained, 20 g of toluene, and 60 g of ethylene glycol monobutyl ether (molecular weight of 118.2), and the resulting mixture was stirred for 30 minutes with the temperature inside the flask at 95° C. Next, 10 g of N,N-dimethylethanolamine (DMEA) was added, and the mixture thus obtained was stirred for 60 minutes with the temperature inside the flask at 95° C. Thereafter, 400 g of 90° C. deionized water was added over 120 minutes; and this solution was cooled while stirring until the flask-internal temperature reached 30° C. This solution was heated again while stirring until the flask-internal temperature reached 95° C.; and part of the toluene and ethylene glycol monobutyl ether was distilled out under reduced pressure. Thereafter, this was cooled to room temperature while stirring; and the solid portion was adjusted to 30% by weight by adding deionized water to obtain the aqueous dispersion composition (1) containing the modified polyolefin resin (1). Tm of the dried product of the aqueous dispersion composition (1) was 91° C.

Example 2

A mixture of 100 parts of propylene-1-butene copolymer (III) (90% by mole of the propylene component and 10% by mole of the 1-butene component; Mw of 400,000; Tm of 100° C.; and tensile modulus of 360 MPa), 3.0 parts of maleic anhydride, and 2.0 parts of dilauryl peroxide were made to react by kneading in a biaxial extruding machine whose temperature was set to 200° C. The inside of the extruding machine was degassed under a reduced pressure to remove unreacted substances and obtain the modified polyolefin resin (2) having Mw of 80,000 and Tm of 100° C. The graft weight of the maleic anhydride was 3.0% by weight.

In the same way as Example 1, except that the modified polyolefin resin (2) thereby obtained was used and the addition amount of DMEA in Example 1 was changed to 7 g, the aqueous dispersion composition (2) was prepared. Tm of the dried product of the aqueous dispersion composition (2) was 94° C.

copolymers (I) and (II) in Example 1, the propylene-1-butene copolymer (IV) (80% by mole of the propylene component and 20% by mole of the 1-butene component; Mw of 60,000; and Tm of 85° C.) and the propylene-1-butene copolymer (V) (90% by mole of the propylene component and 10% by mole of the 1-butene component; Mw of 60,000; and Tm of 100° C.) were used, that the addition amount of maleic anhydride was changed to 3.0 parts, and that the addition amount of di-t-butylperoxide was changed to 2.0 parts. The modified polyolefin resin (5) thereby obtained had Mw of 60,000 and Tm of 90° C. The graft weight of the maleic anhydride was 3.0% by weight.

In the same way as Example 1, except that the addition amount of DMEA in Example 1 was changed to 7 g, the aqueous dispersion composition was prepared. Tm of the dried product of the aqueous dispersion composition (5) was 89° C.

TABLE 1

| | | Modified polyolefin resin | | | Aqueous dispersion composition | |
|---|---|---|---|---|---|---|
| | | Tm (° C.) | Mw (×10,000) | Tensile modulus (MPa) | Grafting weight (% by weight) | Tm (° C.) | Average particle diameter (nm) |
| Example | 1 | 90 | 10 | 266 | 3.0 | 91 | 150 |
| | 2 | 100 | 8 | 367 | 3.0 | 94 | 80 |
| | 3 | 100 | 10 | 399 | 3.0 | 95 | 120 |
| Comparative Example | 1 | 85 | 10 | 208 | 3.0 | 82 | 140 |
| | 2 | 90 | 6 | 254 | 3.0 | 89 | 110 |

Example 3

The modification was carried out in the same way as Example 2, except that the reaction temperature of the biaxial extruding machine in Example 2 was changed to 180° C., to obtain the modified polyolefin resin (3). The modified polyolefin resin (3) thereby obtained had Mw of 100,000 and Tm of 100° C. The graft weight of the maleic anhydride was 3.0% by weight.

In the same way as Example 2, the aqueous dispersion composition was prepared. Tm of the dried product of the aqueous dispersion composition (3) was 95° C.

Comparative Example 1

The modification was carried out in the same way as Example 1, except that in place of the propylene-1-butene copolymers (I) and (II) in Example 1, 100 parts of the propylene-1-butene copolymer (I) was used, that the addition amount of maleic anhydride was changed to 3.0 parts, and that the addition amount of di-t-butylperoxide was changed to 2.0 parts. The modified polyolefin resin (4) thereby obtained had Mw of 100,000 and Tm of 85° C. The graft weight of the maleic anhydride was 3.0% by weight.

In the same way as Example 1, except that the addition amount of DMEA in Example 1 was changed to 7 g, the aqueous dispersion composition was prepared. Tm of the dried product of the aqueous dispersion composition (4) was 82° C.

Comparative Example 2

The modification was carried out in the same way as Example 1, except that in place of the propylene-1-butene The following tests were carried out using the aqueous dispersion compositions obtained in Examples 1 to 3 and Comparative Examples 1 and 2. The test results are summarized in Table 2.

Water-Resistant Peeling (Water-Resistant Adhesion) Test Under High Temperature Condition
Preparation of Coating Material 40 parts (in terms of solid content) of the aqueous dispersion composition obtained in each of the Examples and Comparative Examples, 40 parts (in terms of solid content) of an aqueous acrylic resin (Bayhydrol XP2427; manufactured by Sumika Bayer Urethane Co., Ltd.), 20 parts (in terms of solid content) of an aqueous polyurethane resin (UCOAT UWS-145; manufactured by Sanyo Chemical Industries, Ltd.), 20 parts of conductive carbon (Carbon ECP600JD; manufactured by Lion Corp.), and 80 parts of titanium dioxide (Titanium R-960; manufactured by DuPont de Nemours, Inc.) were blended using usual methods, and the resulting mixture was diluted with deionized water to obtain an aqueous primer coating material having a concentration of 40% in terms of solid content.

Preparation of Test Plate

The aqueous primer coating material prepared so as to result in a dried film thickness of about 25 μm was applied to the resin substrate for a body with an air type spray gun. After having been allowed to stand for 5 minutes, this was pre-heated at 60° C. for 3 minutes, and then applied with an aqueous metallic color base-coat coating material so as to give the dry film a thickness of about 20 μm. After having been allowed to stand for 5 minutes, this was pre-heated at 80° C. for 3 minutes. Next, an acrylic urethane solution type clear coating material was applied so as to give the dry film a thickness of about 35 µm. After having been allowed to stand for 7 minutes, this was baked at 120° C. for 20 minutes to obtain the coated product.

Next, a urethane type adhesive (tradename "3740"; window shielding agent for a car; manufactured by Sunstar Inc.) was applied to the coated product thus obtained so as to give the result size with at least a width of 20 mm, a thickness of 3 mm, and a length of 100 mm. After being covered with releasing paper, the result was evenly pressed with a flat plate. After the flat plate was removed, the result was cured by being allowed to stand under constant temperature and humidity conditions at 23° C. and a relative humidity of 50% for 72 hours. Then, the releasing paper was removed to obtain the test plate.

Testing Procedure

After the test plate thus obtained was put in a constant temperature water bath set to 60° C. for 10 days, the test plate was cooled in water at 23° C. for 1 hour and the following peeling test was conducted.

While pulling the cured adhesive layer by hand in a direction of 90 degrees or more with respect to the coating film, cuts with intervals of 2 to 3 mm were made with a utility knife until the surface of the coating film reached an angle of about 60 degrees with respect to the coating film. The detached state after the adhesive layer was peeled off was assessed in accordance with the following standards expressed as A, B, C, and D:

A: neither detachment of the adhesive layer nor exposure of the coating film is recognized;

B: the coated layer is not destroyed; only the adhesive layer is detached with a cohesion fracture, while the adhesion between the coating film and the adhesive layer is mostly maintained;

C: the coating film is detached with a cohesion fracture; and

D: detachment is recognized at the interface between the coating film and the adhesive layer.

Crosscut Adhesion Test

Preparation of Test Piece

The surface of an ultra-high rigid polypropylene plate was degreased by isopropyl alcohol, this was spray-coated with the aqueous dispersion composition so as to give the dried film a thickness of about 15 µm, and this was pre-heated at 80° C. for 5 minutes. Next, this was spray-coated with a base coating material and allowed to stand for 10 minutes. Then this was applied with a clear coating material and allowed to stand for 10 minutes. Then, after having been baked at 120° C. for 20 minutes, this was allowed to stand at room temperature for 72 hours to obtain the test piece.

Testing Procedure

The coating film of the test piece thus obtained was incised to the base with a utility knife at 2-mm intervals to give 100 crosscut squares. A cellophane adhesive tape was adhered onto this, and peeling at an angle of 180° was repeated 10 times and the remaining coating film was judged. Specifically, the number of remaining squares was counted.

Water-Resistance Adhesion Test

The test piece was prepared in the same way as the crosscut adhesion test. After the test piece was soaked in warm water at 60° C. for 10 days, the swelling state (blistering) of the surface of the coating film was visually observed. The coating film was incised to the base with a utility knife at 2-mm intervals to give 100 crosscut squares. A cellophane adhesive tape was adhered onto this, and then, the cellophane adhesive tape was peeled off at an angle of 180°. A judgement was made of the remaining coating film. For samples in which there was not complete detachment in this test, the same test was continuously repeated 10 times, and the remaining coating film after the 10th peeling was judged. Specifically, the number of remaining squares was counted.

The blistering was assessed in accordance with the following standards:

diameter: (large) 1 to 10 (small)

frequency: none, (less) F, M, MD, D (more).

The term diameter means the size of the blister, in which the number visually recognizable is up to 8. The term frequency means the number of blisters, in which F is an abbreviation for "few", M is an abbreviation for "medium", MD is an abbreviation for "medium dense", and D is an abbreviation for "dense".

TABLE 2

| | | Water-resistance adhesion test under high temperature condition (60° C., 10 days) | Crosscut adhesion test number of remaining squares (/100) | Water-resistance adhesion test (60° C., 10 days) number of remaining squares (/100) | Blisters |
|---|---|---|---|---|---|
| Example | 1 | B | 100 | 100 | None |
| | 2 | B | 100 | 100 | None |
| | 3 | A | 100 | 100 | None |
| Comparative Example | 1 | D | 100 | 69 | None |
| | 2 | D | 100 | 0 | 2M |

Footnotes to Table 2

2M: This Indicates a Blister Diameter of 2 and a Blister Frequency of M

From Table 2, the following can be seen. From the results of the crosscut adhesion test, there is no problem in the adhesiveness itself in any of the aqueous dispersion compositions of the Examples and Comparative Examples. In addition, from the results of the water-resistance peeling test, in all the aqueous dispersion compositions of Examples 1 to 3, the remaining number of squares is 100, and there are no blisters; thus, the aqueous dispersion compositions are excellent in water-resistant adhesiveness under a high temperature condition.

In contrast, in the aqueous dispersion composition of Comparative Example 1, there are no blisters, but the remaining number of squares is 69, so that the water-resistance adhesiveness under a high temperature condition is inferior to the aqueous dispersion compositions of Examples 1 to 3. In the aqueous dispersion composition of Comparative Example 2, the blisters are judged to be 2M (diameter assessment of 2 and frequency assessment of M), and the remaining number of squares is 0, indicating that there is no water-resistance adhesiveness at a high temperature. From the results of the water-resistance adhesion test under a high temperature condition, the assessments of all the aqueous dispersion compositions of Examples 1 to 3 are A or B, suggesting that they can be used in the direct glazing technique and the like.

The invention claimed is:

1. A modified polyolefin resin, comprising a graft-modified product in which a component (A) that is a polyolefin resin is graft-modified with a component (B) that is an α,β-unsaturated carboxylic acid or a derivative thereof, and having
a tensile modulus of 250 MPa or higher, and
a weight-average molecular weight of 70,000 to 200,000,
wherein the tensile modulus is a value measured with the following condition: the polyolefin resin or modified polyolefin resin that has been previously dried is dissolved by heating into an organic solvent; then, the solution thus obtained is applied onto releasing paper so as to form a film with a thickness of about 20 μm; after this is dried for 5 minutes with a blowing dryer whose temperature is set to 100° C., the result is kept for 24 hours under constant temperature and constant humidity conditions at 23° C. and a relative humidity of 50; next, this is cut to a width of 15 mm and a length of 150 mm; then, the releasing paper is removed to obtain a test film; for the test film thus obtained, the tensile modulus is measured with a tensile measurement instrument under the conditions of a pulling speed of 10 mm/minute and a distance between the chucks of 100 mm.

2. The modified polyolefin resin of claim 1, having a melting point measured with a differential scanning calorimeter of 85° C. to 110° C.

3. The modified polyolefin resin of claim 1, wherein the component (A) comprises at least one copolymer selected from the group consisting of an ethylene-propylene copolymer, a propylene-1-butene copolymer, and an ethylene-propylene-1-butene copolymer.

4. The modified polyolefin resin of claim 1, wherein a graft weight of the component (B) in the graft-modified product is in a range of 0.1 to 10% by weight.

5. A dispersion composition comprising the modified polyolefin resin of claim 1.

6. The dispersion composition of claim 5, having a melting point measured with a differential scanning calorimeter of 90° C. to 110° C.

7. A primer, comprising the dispersion composition of claim 5.

8. A coating material, comprising the dispersion composition of claim 5.

9. An ink, comprising the dispersion composition of claim 5.

10. An adhesive, comprising the dispersion composition of claim 5.

* * * * *